United States Patent [19]

Buyalos et al.

[11] 4,432,940
[45] Feb. 21, 1984

[54] REACTOR

[75] Inventors: Edward J. Buyalos, Chester, Va.; Hugh H. Rowan, Chapel Hill; Steven A. Young, Cary, both of N.C.; David Pendlebury, Chester, Va.

[73] Assignee: Allied Corporation, Morris Township, Morris County, N.J.

[21] Appl. No.: 358,177

[22] Filed: Mar. 15, 1982

[51] Int. Cl.³ .............................................. C07C 69/82
[52] U.S. Cl. ................... 422/135; 422/134; 422/191; 422/195; 422/205
[58] Field of Search ............... 422/134, 135, 191, 195, 422/205

[56] References Cited

U.S. PATENT DOCUMENTS

| | | | |
|---|---|---|---|
| 2,507,105 | 5/1950 | Howard et al. | 422/135 X |
| 2,577,856 | 12/1951 | Nelson . | |
| 2,652,386 | 9/1953 | Wallman | 422/135 X |
| 2,727,882 | 12/1955 | Vodonik . | |
| 2,858,195 | 10/1958 | Vieli . | |
| 3,172,736 | 3/1965 | Gee et al. | 422/135 |
| 3,193,360 | 7/1965 | Scoggin . | |
| 3,509,203 | 4/1970 | Michaelis et al. . | |
| 3,737,288 | 6/1973 | Hochman | 422/135 |
| 3,787,481 | 1/1974 | Siclari et al. . | |
| 3,877,881 | 4/1975 | Ono et al. . | |
| 4,007,016 | 2/1977 | Weber . | |
| 4,100,142 | 7/1978 | Schaefer et al. . | |
| 4,222,986 | 9/1980 | Smith et al. | 422/135 X |

FOREIGN PATENT DOCUMENTS

| | | | |
|---|---|---|---|
| 195637 | 2/1958 | Austria | 422/134 |
| 729440 | 5/1955 | United Kingdom . | |

Primary Examiner—Robert L. Lindsay, Jr.

[57] ABSTRACT

In a reactor, for the continuous polymerization of feed materials to higher viscosity process fluid, comprising a vertical, hollow vessel having an inlet for the introduction of feed materials, an outlet for the discharge of process product and an exhaust for reaction vapors; and means for heating the vessel; the improvement comprising a draft tube, partially immersed vertically in the process fluid, the non-immersed end of the tube having at least one annular plate on the periphery thereof which overhangs the process fluid; and an impeller, located within the draft tube and propelling the process fluid up the draft tube and over the plate.

6 Claims, 5 Drawing Figures

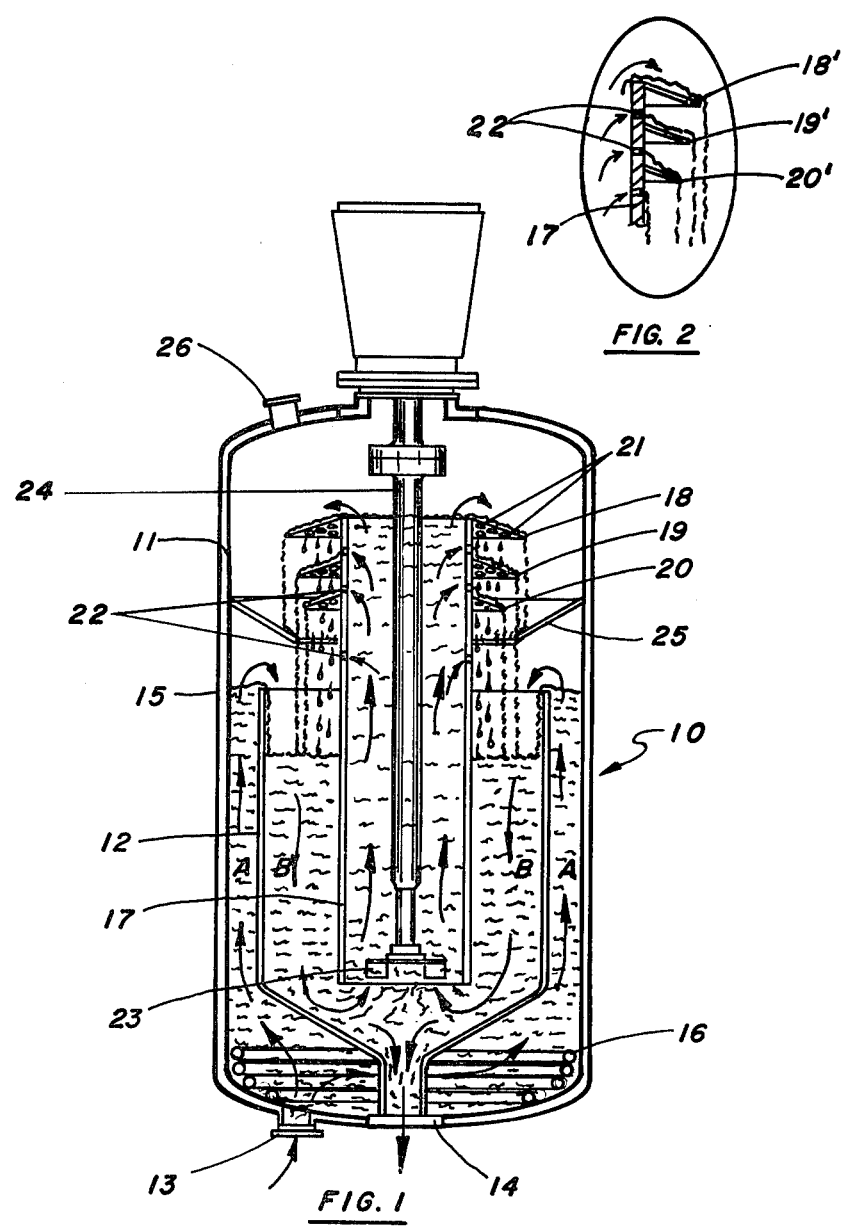

REACTOR

BACKGROUND OF THE INVENTION

1. Field of the Invention

The present invention relates to apparatus for the continuous polymerization of feed material to higher viscosity process product, and more particularly, it relates to a polycondensation reactor which improves mass transfer and hence reaction rate by exposing more of the liquid material to the lowest possible vessel pressure. This acceleration of the polycondensation part of polymerization allows higher intrinsic viscosity synthetic polymeric material to be prepared in the reactor for a given residence time.

2. The Prior Art

This invention is particularly adapted for use in a process for the preparation of linear condensation polyesters as described in U.S. Pat. No. 3,689,461 to Balint et al., hereby incorporated by reference. The polycondensation reactors 12 and 15 of this patent each comprises a vertical, hollow, heated vessel having two reaction stages formed by an annular wall attached within the vessel at its base; the first stage is disposed between the wall and the vessel with the inlet opening thereto for feed of feed materials, and the second stage is confirmed by the wall with the outlet discharging a higher viscosity process product therefrom. The present invention is a modification of this reactor to increase mass transfer and allow increased throughput through the vessel.

Other pertinent art is U.S. Pat. Nos. 2,577,856 to Nelson, 3,509,203 to Michaelis et al., 3,787,481 to Siclari et al., and 4,100,142 to Schaefer et al., and British Patent Specification No. 729,440 to Smith, all of which are hereby incorporated by reference.

SUMMARY OF THE INVENTION

The prior art reactor is a vertical hollow vessel having an inlet for the introduction of feed materials, an outlet for the discharge of process product and an exhaust for reaction vapors; and means for heating the vessel. The improvement of this invention comprises a draft tube, partially immersed vertically in the process fluid, the non-immersed end of the tube having at least one annular plate on the periphery thereof which overhangs, and preferably is inclined towards, the process fluid; and an impeller, located within the draft tube and propelling the process fluid up the draft tube and over the plate.

The reactor preferably comprises a plurality of, most preferably three, annular, parallel, perforated, spaced apart plates on the periphery of the non-immersed end of the draft tube, the draft tube having apertures therethrough in the area between the plates and the area between the process fluid and the plate closest to the immersed end of the draft tube, for feeding process fluid. It is also preferred that the plates progressively overhang the process fluid to a lesser degree the closer the plate is to the immersed end of the draft tube. The reactor is thus modified to generate a greater exposure of polymer surface, which in turn enhances the removal of ethylene glycol and increases the intrinsic viscosity of the polymer.

In the preferred embodiment, the reactor further comprises at least one annular wall within the vessel, attached thereto at its base and forming in conjunction therewith at least two reaction stages, the first stage being disposed between the wall and the vessel with the inlet opening thereto, the last stage being confined by the wall with the outlet discharging therefrom, and the draft tube as described above being partially immersed vertically in the last stage process fluid. The apparatus preferably further comprises an annular baffle connected to the vessel above the first stage and inclined to extend over the first stage and annular wall to partially overhang the next stage.

In the staged reactor, the improvement of this invention comprises (in lieu of the above-described draft tube and impeller) a recycle loop, connected to draw from the last stage for circulation of process fluid to be discharged just above and into the last stage by discharge means. The feed materials are introduced through the inlet to the first stage, overflow into the last stage and are circulated therefrom by the recycle loop to be discharged by discharge means just above and into the last stage, some of the process fluid in the last stage exiting as process product to travel to the next reactor. In the preferred embodiment the discharge means is a sprayer, and the reactor further comprises an annular baffle connected to the vessel above the first stage, as previously described.

In the staged reactor, the improvement of this invention alternately comprises a recycle loop, connected to draw from the first stage for circulation of process fluid to be discharged just above and into the last stage by discharge means. The feed materials are introduced through the inlet to the first stage, circulated therefrom by the recycle loop to be discharged by discharge means just above and into the last stage, some of the process fluid in the last stage overflowing into the first stage to be recirculated and some of the process fluid in the last stage exiting as process product to travel to the next reactor. In the preferred embodiment the discharge means is a sprayer, and the annular wall expands above the first stage to cause filming of the process fluid as it overflows from the last stage to the first stage. Recycling of the polymer creates thin films which enhances ethylene glycol removal and an increase in the intrinsic viscosity of the polymer.

Throughout the present specification and claims, the intrinsic viscosity (of a polyester melt) is given as a measure for the mean molecular weight, which is determined by standard procedures wherein the concentration of the measuring solution amounts to 0.5 g/100 ml, the solvent is a 60 percent phenol/40 percent tetrachloroethane mixture, and the measuring temperature is 25° C.

The preferred polyesters are the linear terephthalates polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-dibenzofuran-dicarboxylic acid. The glycols may contain more than two carbon atoms in the chain, e.g., diethylene glycol, butylene glycol, decamethylene glycol, and bis-(1,4-hydroxymethyl)cyclohexane. Examples of linear terephthalate polyesters which may be employed include poly(ethylene terephthalate), poly(ethylene terephthalate/5-chloroisophthalate) (85/15), poly(ethylene terephthalate/5-[sodium sulfo]-isophthalate) (97/3), poly(cyclohexane-1,4-dimethylene terephthalate), and poly(cyclohexane-1,4- dimethylene terephthalate/hexahydroterephthalate) (75/25).

Although the improved reactors of this invention are particularly suited for the production of polyesters, they are equally suitable for any polycondensation material in which volatiles evolved during polycondensation must be efficiently removed and the residence time within the reactor must be controlled to maintain a quality product.

BRIEF DESCRIPTION OF THE DRAWINGS

In the accompanying drawings, FIG. 1 is a vertical cross-section of the preferred reactor 10 of the present invention; FIG. 2 is a vertical cross-section of an alternate embodiment, imperforate plates 18', 19' and 20' for use in the reactor 10 of the present invention.

DESCRIPTION OF THE PREFERRED EMBODIMENT

Figure 3:
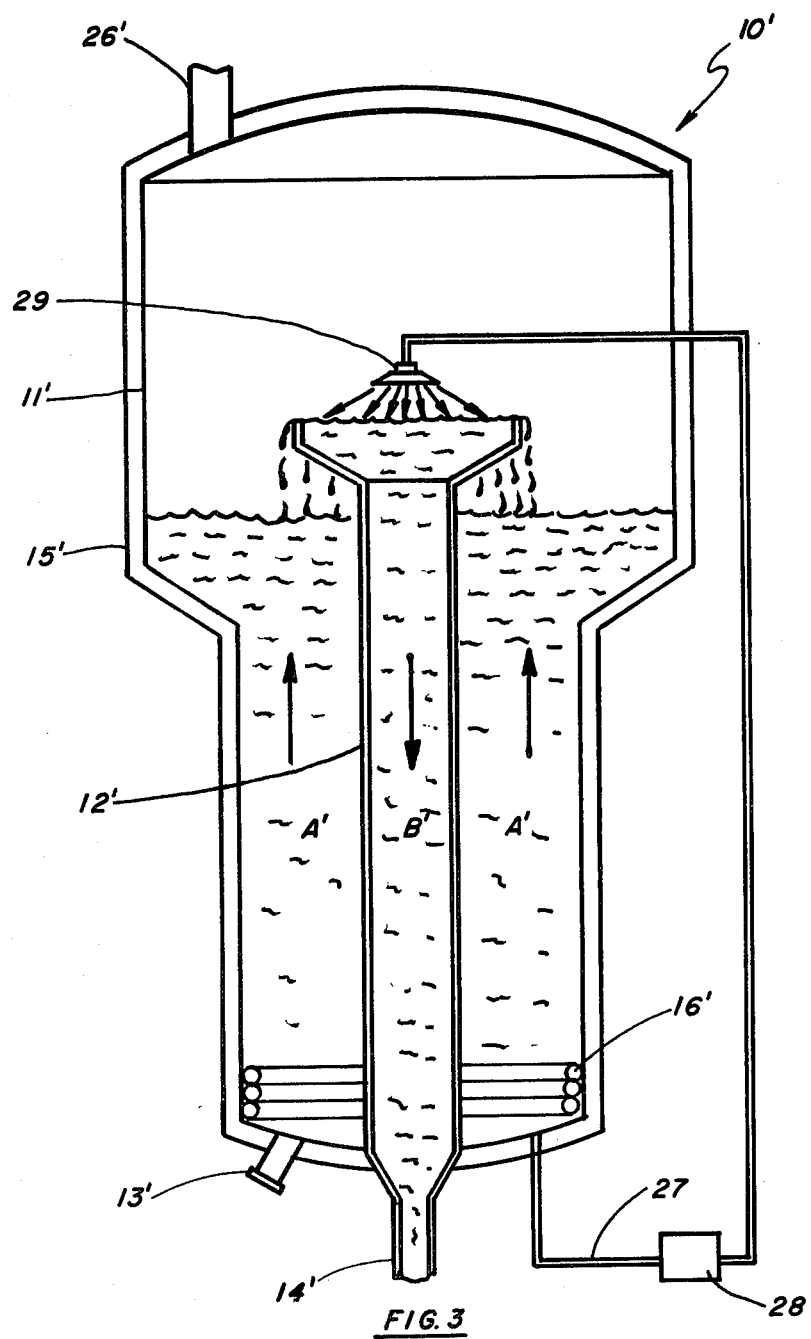
FIGS. 3, 4 and 5 are vertical cross-sections of alternate reactors 10', 10" and 10''', respectively of the present invention.

With reference to the drawings, wherein a preferred embodiment is illustrated in FIG. 1, like numbers indicate like apparatus. Reactor 10 comprises a vertical, hollow, heated vessel 11 having two reaction stages A and B formed by an annular wall 12 attached within vessel 11 at its base; the first stage A is disposed between wall 12 and vessel 11 with an inlet 13 opening thereto for feed of feed materials, and the last stage B is confined by wall 12 with outlet 14 discharging higher viscosity process product therefrom. The means for heating the vessel may be, as illustrated, a jacket 15 and helical tube 16 through which a heat exchange medium such as steam, water or Dowtherm ® is circulated; especially preferred is Dowtherm ® A, vapor phase, the condensate flowing by gravity back to a boiler (unshown).

A central draft tube 17 is partially immersed vertically in last stage B process fluid and secured in place by three or four arms (unshown) radiating from above the immersed portion of draft tube 17 and connected to the interior wall of vessel 11. Draft tube 17 has a series of three annular plates 18, 19 and 20 on the periphery of its non-immersed end, each of which is preferably inclined towards and overhangs last stage B to a point between draft tube 17 and wall 12. Annular plates 18, 19 and 20 are preferably parallel with perforations 19 therein (see FIG. 1), although unperforated annular plates 18', 19' and 20' (FIG. 2) are also acceptable. Annular plates 18, 19 and 20 progressively overhang last stage B to a lesser degree the closer the particular plate is to the immersed end of draft tube 17, i.e., the rim of each plate is closer to draft tube 17 then the rim of the plate above it. Apertures 22 are provided in draft tube 17 in the area between plates 18, 19 and 20, and the area between the last stage B process fluid and plate 20, the plate closest to the immersed end of draft tube 17.

An impeller 23 of any desired type is arranged at the bottom of draft tube 17 and is attached to drive shaft 24 connected to a suitable source of power, unshown (variable speed drive). An annular baffle 25 is connected to vessel 11 above first stage A and inclined to extend over first stage A and annular wall 12 to partially overhang last stage B. An exhaust 26 for reaction vapors is also provided.

Polyester prepolymer at about 270° to 280° C. and having a carboxyl end group concentration of about 150 to 225 milliequivalents per kilogram, a percent esterification of 97.5 to 98.5 and an intrinsic viscosity (measured in 60:40 phenol:tetrachloroethane) of about 0.10 to 0.11 is fed [6000 lb/hr (2700 kg/hr)] to a reactor 10 as shown in FIG. 1. Reactor 10 is operated at 25 to 40 Torr vacuum (3300 to 5300 Pa), and the feed is adjusted to maintain about 0.80 to 1.0 hour retention time in vessel 11. Prepolymer enters first stage A at inlet 13 where free glycol and water are degassed and agitate first stage A. Gases and liquid proceed up the annulus (wall 12) between first stage A and last stage B to pour over into last stage B. Annular baffle 25 is a splash baffle which directs any gases which otherwise would escape to exhaust at exhaust 26, down into last stage B. Flow of the liquid materials is indicated by arrows in FIG. 1. The level of last stage B process fluid is controlled by any conventional level device (unshown). Last stage B contains draft tube 17 with a variable speed drive to pump prepolymer up to film over plates 18, 19 and 20 located on the periphery of the non-immersed end of draft tube 17. Impeller 23 pumps prepolymer at the rate of 50 to 200 gallons per minute (0.003 to 0.013 m$^3$/s) over these plates 18, 19 and 20. The flow rate over plates 18, 19 and 20 is proportional to the surface area of the plates. Prepolymer also flows through apertures 22 below plate 20. Thin films are generated and flow back into the melt pool of last stage B. These thin films scrub the vapor load leaving the first stage A of reactor 10. This scrubbing action removes the entrained oligomers from this stream. Also, this increased filming increases the intrinsic viscosity leaving at outlet 14 to about 0.22 to 0.23, as compared to 0.17 to 0.18 for a conventional reactor.

As stated previously, reactor 10 could be utilized as either reactor 12 or 15 shown in FIG. 1 of U.S. Pat. No. 3,689,461. Operating in the above-described manner decreases the oligomer load to the next reactor, decreases the glycol load to the next reactor and allows significant rate increases in the reactor.

FIG. 3 illustrates an alternate reactor 10' of the present invention. Apparatus identical to that of FIG. 1 is indicated by the same number with a prime. Reactor 10' comprises a recycle loop 27, connected to draw from first stage A' for circulation of process fluid (recycle pump 28) to be discharged just above and into last stage B' by discharge means 29, illustrated in FIG. 3 as a spray nozzle. Annular wall 12' preferably expands above first stage A'. The feed materials are introduced through inlet 13' to first stage A'. There, rising vapor bubbles help to mix the feed materials. The feed materials are circulated therefrom by recycle loop 27 to be discharged by sprayer 29 just above and into last stage B'. Some of the process fluid in last stage B' overflows into first stage A' to be recirculated, and some of the process fluid in last stage B' exits as process product at outlet 14' to travel to the next reactor. Recycling of the polymer through spray nozzle 29 creates thin films of spray which enhances ethylene glycol removal and an increase in the intrinsic viscosity of the polymer.

Figure 4:
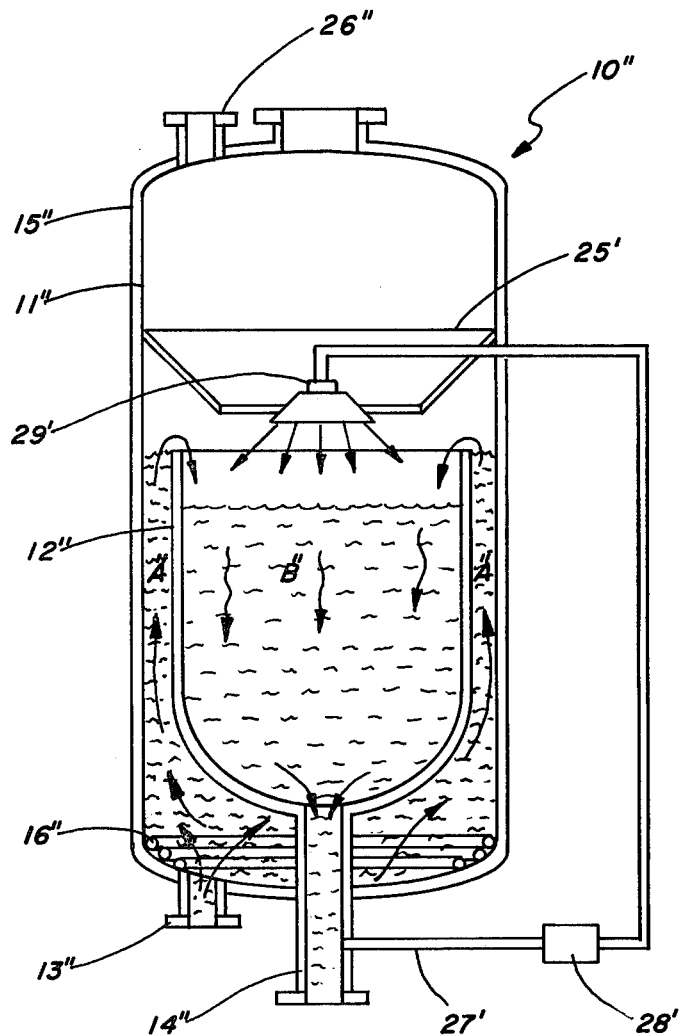

FIG. 4 illustrates alternate reactor 10" of the present invention. Apparatus identical to that of FIGS. 1 and 3 is indicated by the same number with either a double prime or single prime, respectively. Reactor 10" comprises a recycle loop 27', connected to draw from last stage B" for circulation of process fluid (recycle pump 28') to be discharged just above and into the last stage 28" by discharge means 29', illustrated as a spray nozzle. Annular baffle 25' is connected to vessel 11" above first stage A" and inclined to extend over first stage A" and annular wall 12" to partially overhang the next stage B". The feed materials are introduced through inlet 13" to first stage A". There, free glycol and water are degassed and agitate first stage A". Gases and liquid proceed up the annulus (wall 12") between first stage A" and the next stage B" to pour over into the last stage B". Annular baffle 25' directs any gases which otherwise would escape to exhaust at exhaust 26", down into the next stage B". Process fluid is circulated from last stage B" by recycle loop 27' to be discharged by sprayer 29' just above and into last stage B". Some of the process fluid in last stage B" exits as process product at outlet 14" to travel to the next reactor.

Figure 5:
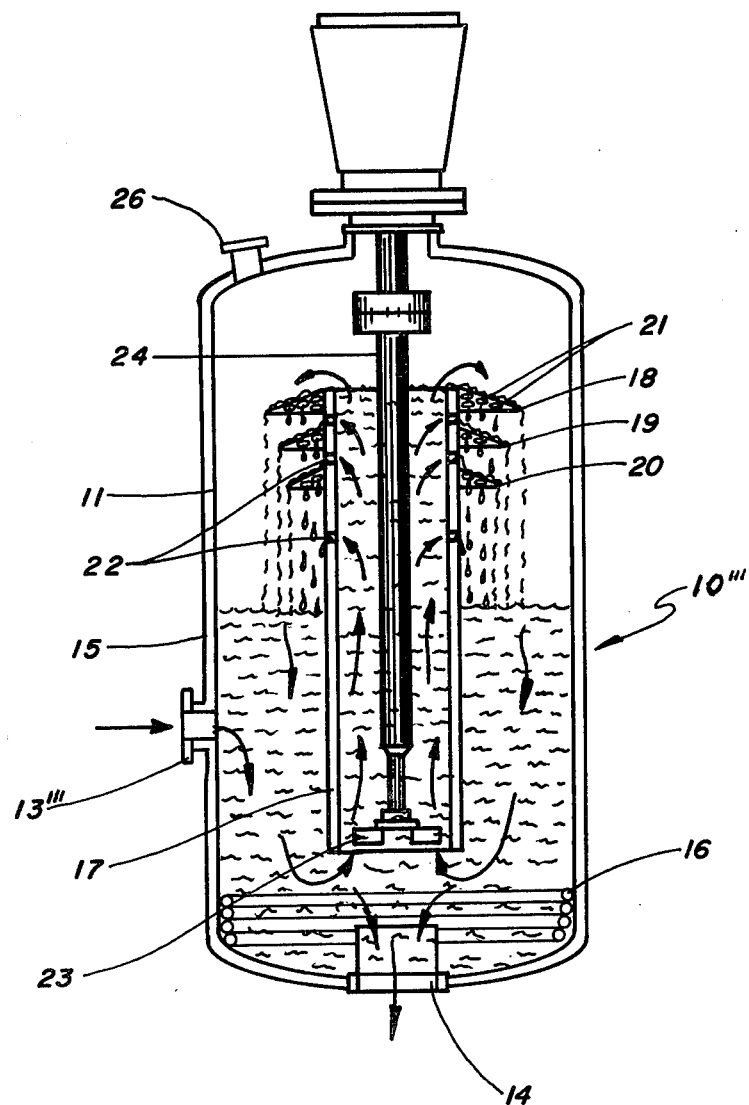

FIG. 5 illustrates alternate reactor 10''' of the present invention. Reactor 10''' is the single stage version of reactor 10 of FIG. 1, changed to introduce prepolymer at inlet 13''' at the side, rather than the base, of vessel 11. Imperforate plates 18', 19' and 20' of FIG. 2 may be utilized in reactor 10''' in lieu of perforated plates 18, 19 and 20.

What is claimed is:

1. In a reactor, for the continuous polymerization of feed materials to higher viscosity process fluid, comprising a vertical, hollow vessel having an inlet for the introduction of feed materials, an outlet for the discharge of process product and an exhaust for reaction vapors; means for heating the vessel; and an annular wall within the vessel attached thereto at its base and forming in conjunction therewith at least two reaction stages, the first stage being disposed between the wall and the vessel with the inlet opening thereto, the last stage being confined by the wall with the outlet discharging therefrom; the improvement comprising:

a recycle loop, connected to draw from the first stage for circulation of process fluid to be discharged just above and into the last stage by discharge means; whereby feed materials are introduced through the inlet to the first stage, circulated therefrom by the recycle loop to be discharged by discharge means just above and into the last stage, some of the process fluid in the last stage overflowing ultimately into the first stage to be recirculated and some of the process fluid in the last stage exiting to travel to the next reactor.

2. The reactor of claim 1 wherein the discharge means is a sprayer.

3. The reactor of claim 1 wherein the annular wall expands above the first stage to cause filming of the process fluid as it overflows from the last stage to the first stage.

4. In a reactor, for the continuous polymerization of feed materials to higher viscosity process fluid, comprising a vertical, hollow vessel having an inlet for the introduction of feed materials, an outlet for the discharge of process product and an exhaust for reaction vapors; means for heating the vessel; and at least one annular wall within the vessel, attached thereto at its base and forming in conjunction therewith at least two reaction stages, the first stage being disposed between the wall and the vessel with the inlet opening thereto, the last stage being confined by the wall with the outlet discharging therefrom; the improvement comprising:

a recycle loop, connected to draw from the last stage for circulation of process fluid to be discharged just above and into the last stage by discharge means; whereby feed materials are introduced through the inlet to the first stage, over-flow into the last stage and are circulated therefrom by the recycle loop to be discharged by discharge means just above and into the last stage, some of the process fluid in the last stage exiting to travel to the next reactor.

5. The reactor of claim 4 wherein the discharge means is a sprayer.

6. The reactor of claim 4, further comprising an annular baffle connected to the vessel above the first stage and inclined to extend over the first stage and annular wall to partially overhang the next stage.

* * * * *